United States Patent Office 3,425,522
Patented Feb. 4, 1969

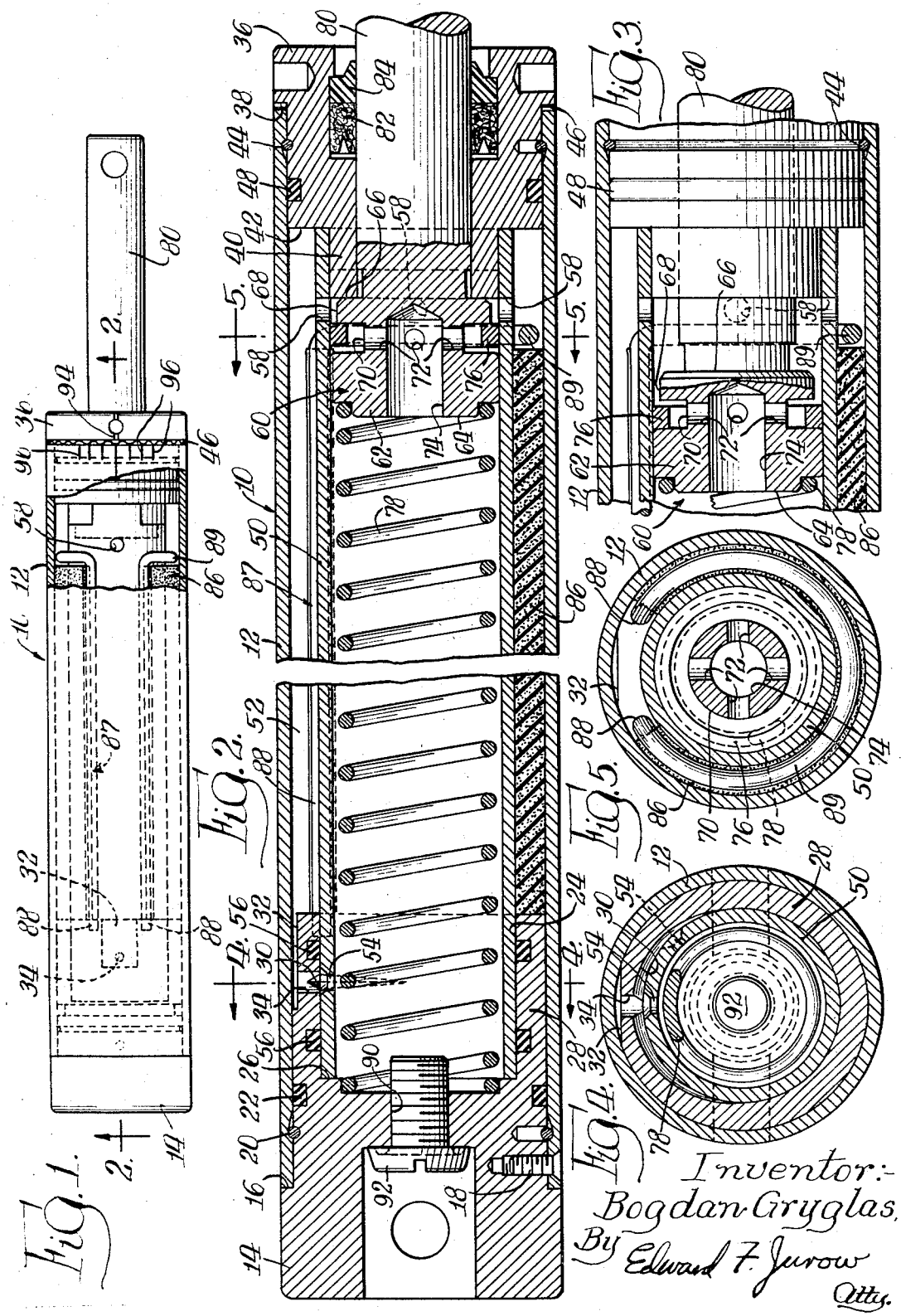

3,425,522
ADJUSTABLE HYDRAULIC DASHPOT
Bogdan Gryglas, Chicago, Ill., assignor to Efdyn Corporation, Chicago, Ill., a corporation of Illinois
Filed May 26, 1967, Ser. No. 641,567
U.S. Cl. 188—97    3 Claims
Int. Cl. F16d 57/06

ABSTRACT OF THE DISCLOSURE

A hydraulic dashpot having a pressure tube with a port associated with orifice means through which fluid is metered upon application of impact or vibrational forces to a piston slidable in the pressure tube, and wherein the pressure tube is rotatable for regulating the flow of fluid through the port.

BACKGROUND OF THE INVENTION

*Field of the invention*

The present invention pertains generally to a hydraulic dashpot, which is adapted for damping out vibrational energy, for example, in machine applications and the like, and which is capable of being adjusted to absorb vibrations of differing kinetic energy quantities.

*Description of the prior art*

Conventionally, hydraulic dashpots comprise a pressure tube filled with fluid and having slidably mounted therein a piston which is connected to a piston rod adapted to receive impact or vibrational forces. Heretofore, certain hydraulic dashpots or the like have been provided with metering orifice means for the pressure tube through which fluid is forced when the dashpot is under load, and However, such prior constructions have not been as efficient in operation, as readily adjustable and as economical to manufacture as might be desired. Moreover, many of these hydraulic dashpots have been operable solely in a horizontal position.

SUMMARY OF THE INVENTION

The present invention is concerned with a hydraulic dashpot comprising an outer casing, a pressure tube within the casing and defining a chamber therebetween, a piston assembly axially moveable within the pressure tube, a piston rod connected to the piston assembly and extending outwardly of the casing for receiving impact or vibrational forces, a metering port in the pressure tube, and a collar surrounding the pressure tube and defining orifice means therein adjacent the metering port. The relative positions of the pressure tube and the collar are adjustable to vary the effective area of the orifice means whereby to regulate the flow of fluid outwardly of the pressure tube through the metering port to the chamber as the piston assembly moves through the pressure tube.

More particularly, the collar is formed with an internal crescent-shaped groove extending transversely of the axis of the pressure tube to define the orifice means, and with a radial aperture at the center of the crescent-shaped groove communicating with the chamber. Preferably, the collar is formed as an extension of a closure member secured in the rearward end of the casing and seating the rearward end of the pressure tube, and a gland assembly is mounted for manual rotation in the forward end of the casing and is secured to the pressure tube whereby rotation of the gland assembly effects rotation of the pressure tube and metering port to vary the effective orifice area of the crescent-shaped groove at the metering port. Additionally, spring means is disposed intermediate the casing and the gland assembly whereby to maintain the latter in any preselected rotational position, and cellular means is disposed in the chamber to serve as an accumulator thereby permitting the hydraulic dashpot to be completely filled with hydraulic fluid and to be mounted in any position.

BRIEF DESCRIPTION OF THE DRAWING

FIGURE 1 is a side elevational view of a hydraulic dashpot incorporating the principles of the present invention, with portions being broken away to show the interior thereof;

FIGURE 2 is a longitudinal median sectional view of the dashpot of FIGURE 1, on an enlarged scale, taken substantially along the line 2—2 in FIGURE 1, looking in the direction indicated by the arrows;

FIGURE 3 is a partial longitudinal median sectional view corresponding generallly to FIGURE 2, but showing the piston means and piston rod moved inwardly from their normal rest position;

FIGURE 4 is a transverse sectional view, taken substantially along the line 4—4 in FIGURE 2, looking in the direction indicated by the arrows; and FIGURE 5 is a transverse sectional view, taken substantially along the line 5—5 in FIGURE 2, looking in the direction indicated by the arrows.

DESCRIPTION OF THE PREFERRED EMBODIMENT

Referring now to FIGURES 1 and 2, there is indicated generally by the reference numerical 10 a hydraulic dashpot incorporating the principles of the present invention. The dashpot 10 includes a casing or jacket 12 preferably in the form of a tube.

Mounted in the rearward end of the casing 12 is a closure or back head member 14. The forward section of the closure member 14 is of reduced diameter whereby to define an annular shoulder 16 against which is seated the rearward end of the casing 12. The closure member 14 is secured in assembled relation within the casing 12 by means of a screw 18 and a locking wire 20. To effect a seal between the casing 12 and closure member 14, a suitable O-ring 22 is provided. An axial stepped bore 24 is formed in the forward end of the closure member 14 whereby to define an internal shoulder 26 and an annular collar extension 28. The collar 28, as shown in FIGURES 2 and 4, is formed with an internal crescent-shaped groove 30 which is triangular in cross-section, an external chordal flat 32, and an interconnecting radial aperture 34 at the center of the crescent-shaped groove 30.

Mounted at the forward end of the casing 12 is a gland member 36. The intermediate section of the gland member 36 is of reduced diameter whereby an annular shoulder 38 is defined, and the inner end portion 40 of the gland member 36 is of still further reduced diameter whereby an annular shoulder 42 is defined. The gland member 36 is arranged for manual rotation within the casing 12, with a locking wire 44 serving to axially locate the gland 36, and with an annular corrugated wave spring 46 being disposed intermediate the gland shoulder 38 and the forward end of the casing 12 to restrain movement of the gland 36 from any preselected rotational position. Additionally, an O-ring seal 48 is mounted in the outer periphery of the gland member 36 for sealing engagement with the inner periphery of the casing 12.

Extending lengthwise within the casing 12 is a pressure tube 50 which at its rearward end is received in the bore 24 of the closure member 14 and at its forward end is keyed on the inner end portion 40 of the gland member 36 for rotation therewith. The pressure tube 50 is axially located between the shoulder 26 and 42 of the closure and gland members 14 and 36 respectively, and is disposed coaxially of the casing 12 whereby to define a generally annular fluid chamber 52 therebetween. Adjacent the rearward end of the pressure tube 50 there is provided in the wall thereof a radial metering port 54 which is aligned with the plane of the crescent-shaped groove 30. Suitable O-ring seals 56 are mounted on the opposite sides of the metering port 54 between the collar extension 28 and the pressure tube 50. Adjacent the forward end of the pressure tube 50, there are provided four radial passageways 58, equi-distantly spaced apart in a transverse plane.

Mounted for axial movement within the pressure tube 50 is a piston assembly 60 which includes a piston portion 62 presenting a rearward side 64 and a forward side 66. The piston 62, at its outer periphery, is formed with an annular recess 68 and with an annular groove 70 which communicates with radial ports 72 and an axial port 74 opening at the rearward side 64. Arranged within the piston groove 70 is a floating piston ring 76 which is narrower than the width of the groove 70 for a purpose to be described hereinafter. The piston assembly 60 is spring biased forwardly by means of a coil spring 78 arranged between the bottom of the bore 24 of the closure member 14 and piston 62.

A piston rod 80, at its inner end, is formed integrally with, or otherwise secured to, the piston 62, and extends from the forward side 66 thereof outwardly of the casing 12 for receiving impact or vibrational forces. The piston rod 80 is slidably guided in the gland member 36. Supported within the gland member 36 are an annular piston rod seal 82 and an annular piston rod wiper 84 which engage the outer periphery of the piston rod 80 and provide a fluid seal during axial sliding movement of the latter. An elongated cellular member 86, which is generally U-shaped in cross-section and which may be fabricated of rubber or the like, is disposed in the chamber 52. The member 86 is maintained in proper position by means of a continuous wire member 87 formed with parallel leg portions 88 and a forward U-shaped loop 89. The rear ends of the leg portions 88 are secured in the collar extension 28, while the loop 89 surrounds the pressure tube 50 immediately rearwardly of the four radial passageways 58. Finally, the rear closure member 14 is formed with an axial threaded opening 90 through which hydraulic fluid is introduced to completely fill the dashpot 10, and a suitable plug screw 92 is provided therefor.

In the operation of the hydraulic dashpot 10, impact or vibrational forces received by the piston rod 80 cause the latter and the piston assembly 60 to move rearwardly within the pressure tube 50. As rearward movement of the piston assembly 60 commences, pressure initially built up in the hydraulic fluid within the pressure tube 50 causes the floating piston ring 76 to be forced into abutment with the forward side of the annular groove 70 (FIGURE 2) thereby preventing hydraulic fluid from flowing past the piston 62. During rearward movement of the piston assembly 60, the hydraulic fluid is forced outwardly of the pressure tube 50 through the metering port 54, the crescent-shaped groove 30, the radial aperture 34, and then along the chordal flat 32 to the chamber 52. Operationally, the portion of the triangular groove 30 adjacent the port 54 serves as a metering orifice. By metering the displacement of hydraulic fluid from the pressure tube 50 in the manner described, high energy absorption or dissipation characteristics are attained. Fluid flowing within the chamber 52 is transmitted through the radial passageways 58 to the interior of the pressure tube 50 on the forward side of the piston assembly 60. At the same time, the cellular member 86, which serves as an accumulator, accommodates the fluid displaced by the piston rod 80, thereby permitting the hydraulic dashpot 10 to be completely filled with hydraulic fluid and to be mounted and operated at any attitude. In this connection, the leg portions 88 of the retaining wire 87 serve to prevent the cellular member 86 from shifting circumferentially out of its normal position into the path of the jet stream of fluid being discharged along the chordal flat 32 into the chamber 52. Correspondingly, the loop 89 of the retaining wire 87 serves as an axial stop for the cellular member 86 and prevents the latter from covering the passageways 58.

When the impact force is removed from the piston rod 80, the spring 78 serves to return the piston assembly 60 to the normal rest position shown in FIGURE 2. During such forward return motion of the piston assembly 60, the floating piston ring 76 abuts the rearward side of the annular groove 70 (FIGURE 3) thereby permitting the free flow of hydraulic fluid past the piston 62 through the annular recess 68, the annular groove 70 and the ports 72 and 74. At the same time, hydraulic fluid in the pressure tube 50 on the forward side of the piston asembly is permitted to flow outwardly thereof through the passageways 58.

To absorb loads or vibrational forces with a higher kinetic energy, the gland member 36 may be manually rotated to effect a corresponding rotation of the pressure tube 50. As the pressure tube 50 is rotated, the metering port 54 is moved circumferentially along the crescent-shaped groove 30. The port 54 may be moved, for example, from the position shown in solid lines in FIGURE 4 at the deepest portion of the groove 30 to the position shown in dotted lines at a shallower portion of the groove. In this adjusted position of the port 54, the cross-sectional area of the groove 30 adjacent the port 54, and hence the effective metering orifice area of the groove, 30, are less than when the port 54 is in the centered solid line position. Consequently, increased resistance is offered to the flow of fluid outwardly of the pressure tube 50. To again accommodate reduced forces, the gland member 36 and pressure tube 50 may be rotated to return the metering port 54 to the centered position where the effective metering orifice area of the groove 30 is at a maximum. The groove 30 diminishes uniformly in cross-sectional area from its center to each end. Therefore, the effective metering orifice area is adjustable linearly. Also, because the groove 30 is symmetrical lengthwise about its center, a corresponding movement of the port 54 in either direction from its centered position causes an equal decrease in the effective metering orifice area. The metering arrangement may be rendered inoperative by moving the port 54 beyond either end of the groove 30 as may be effected by rotating the gland member 36 and pressure tube 50 approximately 90°, or more, in either direction from center. To facilitate adjustment of the dashpot 10, the gland member 36 may be provided with a suitable indicium 94 (FIGURE 1) which is alignable with indicia 96 provided on the casing 12. Finally, the aforedescribed corrugated wave spring 46 serves to retain the gland member 36, and hence the pressure tube 50 and metering port 54, in any preselected rotational position. As a result of the construction described above, the hydraulic dashpot 10 is efficient in operation, is conveniently adjustable and is economical to manufacture and use.

While there has been shown and described what is believed to be a preferred embodiment of the present invention, it will be understood by those skilled in the art that various rearrangements and modifications may be made therein without departing from the spirit and scope of the invention.

I claim:

1. A hydraulic dashpot comprising an elongated outer casing having a forward end and a rearward end, a rotatable pressure tube extending lengthwise within said casing and defining a chamber therebetween, a gland assembly mounted for manual rotation in said forward end of said casing, a piston assembly axially movable within said pressure tube and presenting forward and rearward sides, a piston rod connected to said piston assembly and extending from the forward side thereof outwardly of said forward end of said casing for receiving impact forces, said piston rod extending axially through said gland assembly, said pressure tube having a radial metering port in the wall thereof, a stationary collar surrounding said pressure tube within said casing and having an internal crescent-shaped groove extending transversely of the axis of said pressure tube and defining orifice means therein adjacent said metering port, said collar having a radial aperture at the center of said crescent-shaped groove in communication with said chamber, and said gland assembly being connected to said pressure tube whereby rotation of said gland assembly effects rotation of said pressure tube relative to said collar to vary the effective orifice of said crescent-shaped groove whereby to regulate the flow of fluid outwardly of said pressure tube through said metering port to said chamber as said piston assembly moves rearwardly in said pressure tube.

2. The hydraulic dashpot of claim 1 wherein said gland assembly is formed with a shoulder facing said forward end of said casing, and including spring means intermediate said shoulder and said forward end of said casing whereby to maintain said gland assembly in any preselected rotational position.

3. A hydraulic dashpot comprising an elongated outer casing having a forward end and a rearward end, a rotatable pressure tube extending lengthwise within said casing and defining a chamber therebetween, a piston assembly axially movable within said pressure tube and presenting forward and rearward sides, a piston rod connected to said piston assembly and extending from the forward side thereof outwardly of said forward end of said casing for receiving impact forces, said pressure tube having a radial metering port in the wall thereof and being formed with at least one passageway in the wall thereof for transmitting fluid, flowing outwardly of said metering port and through said chamber, to the interior of said pressure tube on said forward side of said piston assembly, a stationary collar surrounding said pressure tube within said casing and having an internal crescent-shaped groove extending transversely of the axis of said pressure tube and defining orifice means therein adjacent said metering port, said collar having a radial aperture at the center of said crescent-shaped groove in communication with said chamber, said collar being an extension of a closure member secured in said rearward end of said casing and seating the rearward end of said pressure tube, a gland assembly mounted for manual rotation in said forward end of said casing, said piston rod extending axially through said gland assembly, said gland assembly being connected to said pressure tube whereby rotation of said gland assembly effects rotation of said pressure tube relative to said collar and movement of said metering port along said crescent-shaped groove to vary the effective orifice area of the latter whereby to regulate the flow of fluid outwardly of said pressure tube through said metering port to said chamber as said piston assembly moves rearwardly in said pressure tube, and cellular means disposed in said chamber and serving as an accumulator.

References Cited

UNITED STATES PATENTS

| | | | |
|---|---|---|---|
| 984,377 | 2/1911 | Kilgour | 188—88 |
| 2,117,837 | 5/1938 | Casper | 188—88 |
| 2,628,692 | 2/1953 | Hufferd | 188—88 |
| 3,344,894 | 10/1967 | Kenworthy. | |

GEORGE E. A. HALVOSA, *Primary Examiner.*